United States Patent
Wechsler

[11] 3,965,763
[45] June 29, 1976

[54] BICYCLE GEAR SHIFT

[76] Inventor: Joseph W. Wechsler, 925 Enchanted Way, Pacific Palisades,, Calif. 90272

[22] Filed: May 27, 1975

[21] Appl. No.: 580,928

Related U.S. Application Data

[63] Continuation-in-part of Ser. No. 479,990, June 17, 1974, Pat. No. 3,901,095.

[52] U.S. Cl. .............................. 74/217 B; 74/242; 74/489; 280/236; 116/124 M
[51] Int. Cl.² ..................... B62M 9/00; B62M 1/02; F16H 7/22; F16H 9/00
[58] Field of Search .............. 74/242, 217 B, 217 S, 74/217 C, 489, 527, 501; 280/236, 261; 116/124 M

[56] References Cited
UNITED STATES PATENTS 3,121,575  2/1964  Bourgi ................................. 74/242
3,901,095  8/1975  Wechsler ........................... 74/217 B Primary Examiner—Benjamin W. Wyche
Assistant Examiner—A. Russell Burke
Attorney, Agent, or Firm—Ralph B. Pastoriza

[57] ABSTRACT

A ten-speed bicycle gear shift includes front and rear derailleurs actuated by a single continuous cable. Movement of the cable through a discrete given distance in one direction increases the gear ratio and movement of the cable through the same discrete given distance in an opposite direction decreases the gear ratio. A rotatable dial is mounted on the handlebar of the bicycle for easy manual turning and includes a cable drum such that turning the dial in one direction through a given circumferential distance moves the cable through the referred to given distance in one direction and turning of the dial in an opposite direction through the same given circumferential distance moves the cable through the given distance in an opposite direction. Gear numbers and a viewing window are included in the dial structure so that the particular gear position can be visually observed. The gear shift is further characterized by cam arrangements for positively positioning the derailleurs in accordance with movement of the cable to selected positions.

5 Claims, 10 Drawing Figures

BICYCLE GEAR SHIFT

This application is a continuation-in-part of my co-pending application Ser. No. 479,990 filed June 17, 1974 now U.S. Pat. No. 3,901,095 entitled BICYCLE GEAR SHIFT.

This invention relates generally to bicycles and more particularly to an improved gear shift mechanism for bicycles.

BACKGROUND OF THE INVENTION

In the bicycle art the terms "gear" and "sprocket" or "sprocket wheel" are often used interchangeably. In the present case the word gear will be used consistently throughout, it being understood that this term as used is equivalent to a sprocket.

Bicycle gear shifts generally are well known in the art and are usually designed to provide three, five, or ten distinct speeds. Normally where the number of gear positions is five, a rear gear cluster comprised of five gears in coaxial side-by-side relationship is provided together with a derailleur device for shifting the bicycle chain position laterally so that it will engage a desired gear in the cluster depending upon the particular selected gear ratio. In the case of a ten speed bike, there is normally provided a front gear cluster comprised of two gears having different numbers of teeth for cooperation with a rear gear cluster comprised of five gears. In these instances, a front derailleur is necessary to effect shifting of the bicycle chain between the two front gears making up the front gear cluster.

In most of the prior art ten speed bicycle gear shifts, two levers are provided on the frame connected to cables passing respectively to the front and rear derailleurs for operating the same. Each of the cables is normally maintained in tension by a strong spring built into the respective derailleur. Shifting of gears is accomplished by moving one or both of the derailleurs by pulling on the respective cables with the levers against the spring bias. A friction device holds each lever in its moved position so that the bicycle chain can be properly positioned on the selected front and rear gears. A further movement of either or both levers between their extreme positions will again operate the derailleurs to shift to another gear ratio.

Some of the problems encountered with the foregoing arrangements are as follows. First, for most gear positions, both of the levers must be operated. Since these levers are located normally on the down tube or head tube of the bicycle frame, a bicycle rider must continue to steer the bicycle with one hand on the handlebars and use his other hand to successively operate the levers. Moreover, the spring bias and friction hold must be overcome to move the levers. Second, the shift lever stroke is determined by "feel" and guess-work. There is no positive positioning of the derailleur because it has a continuous motion that passes through all intermediate positions. Normally, the shifting is completed when the bicycle chain is caught up on the selected gear and the derailleur may not always be in a consistent position for that particular gear, again depending upon the physical manner in which the lever is operated. Third, to shift the gears on the conventional prior art gear shift bicycles in proper sequence requires a mental analysis on the part of the bicycle rider or a memorization of the proper operating sequences of the two levers. In this respect, there is no easy means for the bicycle rider to determine the particular gear position. Normally he must examine visually the particular gears in the cluster over which the bicycle chain is passing.

In addition to the foregoing, with conventional known gear shifting arrangements, the progression of gear ratio values through ten speeds is erratic; that is, the change in the gear ratio value from one shift to a next successive shift can vary from 5 per cent to 19 per cent. Moreover, the shifting of the front and rear derailleurs when needed is not a consequence of a single lever operation, but rather must be done consecutively resulting in unwanted intermediate gear settings.

BRIEF DESCRIPTION OF THE PRESENT INVENTION

The present invention contemplates an improved gear shift mechanism designed in such a manner as to overcome the foregoing problems.

More particularly, shifting of the gear from any one position to another requires the operation of only a single dial member which is conveniently located on the handlebar so that the bicycle rider can always keep his hands on the handlebars and still easily operate the dial. Moreover, the design is such as to eliminate the heretofore provided strong biasing spring the force of which had to be overcome in the prior art systems. Instead, the present invention utilizes a positive camming arrangement for positioning the derailleur, and the dial movement for actuating the derailleur is indexed in a positive manner so that there is no guess-work or feel involved. As a consequence, the derailleur itself is consistently and properly positioned for each gear ratio.

The foregoing is accomplished, in accord with the preferred embodiment of the present invention, by providing a front gear cluster comprised of coaxial front gears in side-by-side relationship rotatable by the pedals of the bicycle and a rear gear cluster comprised of coaxial rear gears in side-by-side relationship for rotating the rear wheel of the bicycle. A bicycle chain passes over one of the front gears and one of the rear gears. A front derailleur means is provided for shifting the chain from one gear to a next adjacent gear in the front gear cluster upon actuation and a rear derailleur means is provided for shifting the chain from one gear to a next adjacent gear in the rear cluster upon actuation. A single continuous actuating cable passes through the front and rear derailleur means in series, the front derailleur means being actuated in response to movement of the cable through a given distance and the rear derailleur means being actuated in response to movement of the gear through twice said given distance.

A dial member including a drum is provided on the handle-bars of the bicycle for moving the cable through successive given distances in one direction upon successive movement of the dial member in a clockwise direction, and through successive given distances in an opposite direction upon successive movement of the dial member in a counter-clockwise direction. Successive movement of the dial in the clockwise direction successively decreases the gear ratio and successive movement of the dial in the counterclockwise direction successively increases the gear ratio, although these motions may be reversed if desired.

A unique feature of this invention comprises the use of camming means in the form of cylindrical cam members having camming grooves therein for positively effecting the shifting of the derailleur means. The design of these cam members and associated coupling of the continuous actuating cable thereto as well as the manually operable actuating means for the continuous cable are specifically modified and improved over the corresponding portions of the gear shift described in my heretofore referred-to pending parent patent application.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
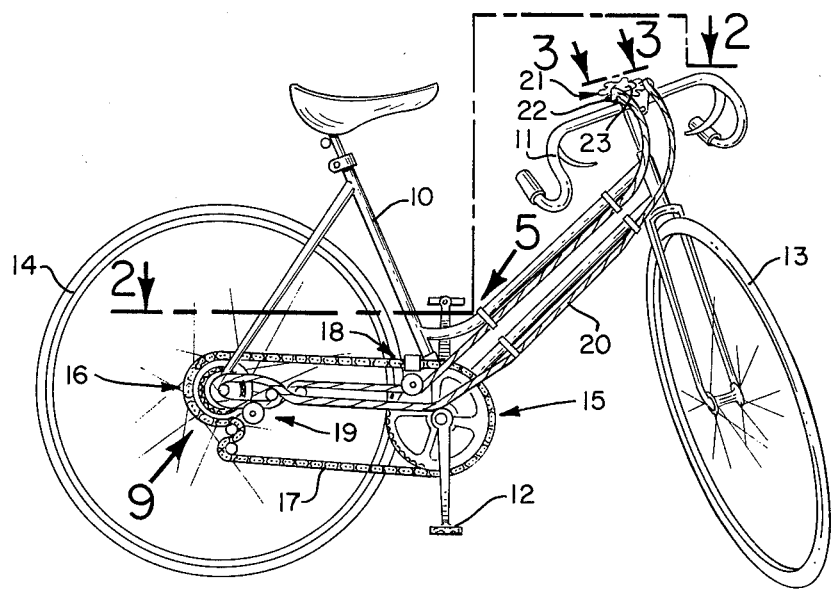
FIG. 1 is a side elevational view of a bicycle incorporating the improved gear shift of this invention.

Referring first to FIG. 1, there is shown a bicycle comprised of a frame structure 10 mounting handlebars 11, pedals 12, and front and rear wheels 13 and 14.

The improved gear shift mechanism of the present invention includes a front gear cluster 15 and a rear gear cluster 16. A bicycle chain 17 passes over one of the gears in the front gear cluster and one of the gears in the rear gear cluster. A front derailleur means indicated generally at 18 is associated with the front gear cluster and a rear derailleur means indicated generally at 19 is associated with the rear gear cluster.

Actuation of the front and rear derailleur means 18 and 19 is achieved by the provision of a single continuous actuating cable 20 passing from a manually operable dial means 21 mounted on the handlebars 11. Cable 20 passes through the front and rear derailleur means 18 and 19 in series and thence back to the dial means 21. The arrangement is such that partial rotation of the dial through a given circumferential distance in one direction or the other functions to move the cable a given distance in one direction or the other. One or both of the derailleur means is actuated in response to movement of the cable through the referred to given distance.

As a consequence of the foregoing, the physical position of the cable determines the particular gear position or ratio. As will become clearer as the description proceeds, the dial means 21 includes a drum 22 about which the cable 20 is wound. The drum includes numerals indicating various rotated positions. A stationary cover 23 overlies the drum and includes a window. By observing the number appearing in the window of cover 23 the various gear combinations established by the various successive positions of the drum and thus the cable can be readily discerned by a bicycle rider.

Figure 2:
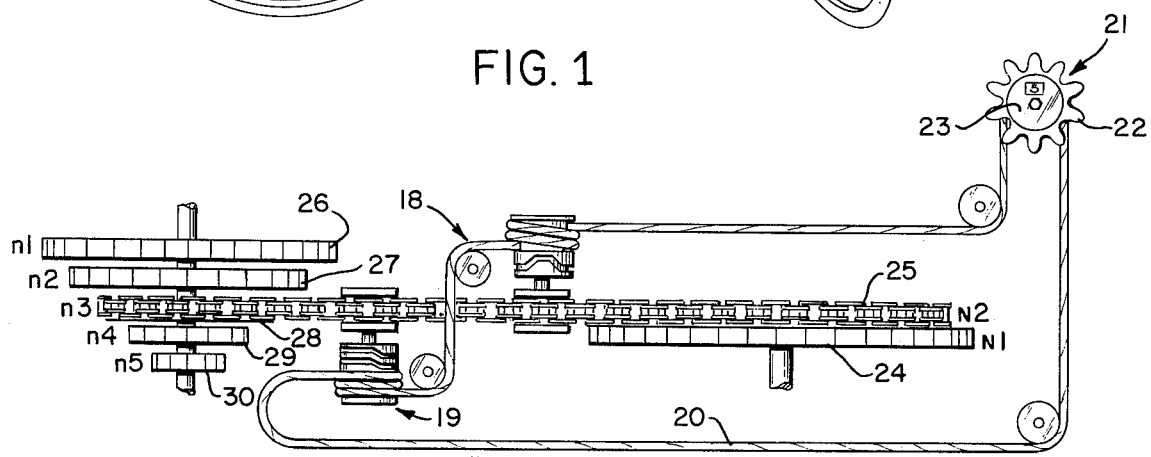
FIG. 2 is a highly schematic functional type block diagram illustrating the inter-relationship of components making up the gear shift mechanism wherein front and rear gear clusters are illustrated as viewed in the direction of the arrows 2—2 of FIG. 1.

Referring now to FIG. 2, portions of the above-described dial are shown schematically. As also shown, the front gear cluster includes two gears 24 and 25 having N1 and N2 teeth respectively, different in number from each other. These gears are coaxially mounted in side-by-side relationship and coupled for rotation by the bicycle pedals.

The rear cluster 16 includes at least two and preferably five individual gears as shown at 26, 27, 28, 29 and 30. These gears have respectively $n1$, $n2$, $n3$, $n4$ and $n5$ teeth different from each other coaxially mounted in side-by-side relationship and coupled to rotate the rear wheel of the bicycle.

In FIG. 2, the window in the dial cover 23 is shown exposing the gear position number 5, which is an intermediate gear among ten speeds available.

Figures 3, 4:
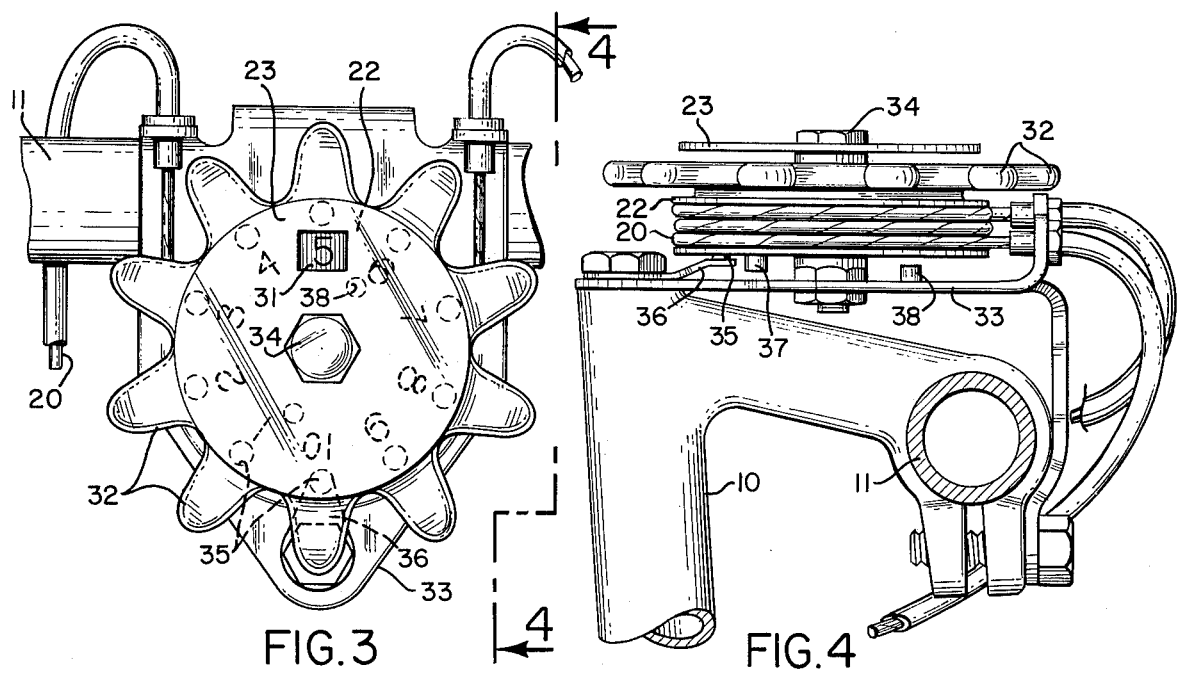
FIG. 3 is a plan view partly broken away of a dial means for the gear shift looking in the direction of the arrows 3—3 of FIG. 2.
FIG. 4 is a side elevation of the dial member in the direction of the arrows 4—4 of FIG. 3.

Referring specifically to the enlarged plan view of the dial structure shown in FIG. 3, the window itself is indicated at 31 on the cover 23. The drum 22 has radially extending knobs 32 for facilitating manual rotation thereof. The cover 23 is stationarily secured to a base plate 33 by means of a bolt 34, this bolt 34 serving as a journal for the drum 22.

As indicated by the phantom circles in FIG. 3, there are provided detents 35 which serve to index the drum to the specific number locations.

The foregoing will be better understood by referring to the side elevation of FIG. 4 wherein there is shown an indexing detent spring 36 secured to the frame 10 and base plate 33 biased upwardly to be received in any one of the detents 35 so that the proper indexing of the drum 22 is assured.

The cable 20 is shown wrapped around the drum 22 for several turns, an intermediate turn being secured at a central portion to the drum 22 so that no slippage will occur between the wound turns of the cable about the drum when the drum is rotated.

In order to limit rotation of the drum to the ten successive positions, there are provided stop means 37 and 38 secured respectively to the bottom of the drum 22 and the base plate 33. These stop means will engage each other when the numeral 1 or the numeral 10 appears in the window 31 of FIG. 3.

From the description thus far, it will be seen that an arrangement has been provided wherein the continuous cable 20 may be successively moved in one direction through ten positions by nine successive partial rotations of the drum 22. This action results in actuation of the front and rear derailleur means in such a manner as to cause a progressive gear change through all ten gears in one direction; for example, to progressively increase the gear ratios. Successive partial rotations of the drum in an opposite direction, in turn, will result in a progressive decrease in the gear ratio through all ten positions assuming that nine successive partial rotations take place from the highest gear position towards the lowest. Each successive gear step is indexed by the indexing spring 36 described in FIG. 4 so that it is assured that the cable 20 is moved in one direction or the other through the heretofore referred to given distance for each partial rotation of the dial drum arrangement.

Since the dial structure is conveniently located on the handlebars, and the drum itself provided with the radially extending knobs 32, a bicycle rider can readily effect the partial rotations of the dial and drum in one direction or the other with his thumbs without having to remove his hands from the bars. Moreover, there is no need for the rider to memorize any particular combination since he will always note that partial rotation of the dial drum in one direction increases the gear ratio whereas partial rotation in an opposite direction decreases the gear ratio.

As further previously described, movement of the cable 20 through a given distance in one direction or the other as a consequence of partial rotation of the dial drum functions to actuate one or both of the front and rear derailleurs 18 and 19 to cause the desired gear shift. For the particular ten-speed bicycle illustrated and with reference to FIG. 2, it will be evident that when the chain passes over the gear 25 with the least number of teeth in the front gear cluster and over the gear 26 constituting the gear with the greatest number of teeth in the rear cluster, the bicycle will be in its lowest gear position and the number 1 will appear in the window 31 of the cover of FIG. 3. To shift to the next gear position 2, the bicycle rider will simply partially rotate the drum in a counterclockwise direction thus moving the number 2 under the window and simultaneously actuating the front derailleur means 18 to shift the bicycle chain 17 from the second gear 25 having N1 teeth to the first gear 24 having N2 teeth. Since the rear derailleur means 19 requires, for actuation, movement of the cable 20 twice through the referred to given distance, it is not actuated so that the chain 17 will remain on the larger gear 26 in the example described.

If the rider at this point wishes to shift back to position 1, he will simply partially rotate the dial drum 22 in a clockwise direction thereby moving the cable to actuate the front derailleur 18 to shift the chain 17 back to the first gear 24.

Should the bicycle rider wish to progressively shift to higher gears, he will simply successively partially rotate the dial drum as initially decribed in a counterclockwise direction and because two successive movements of the drum are necessary to cover twice the referred to given distance of movement of the cable, the rear derailleur 19 will be actuated every other partial rotation.

The particular gears engaged for each successive gear position from the lowest to the highest are set forth in the following table:

| Gear Position | Gears Engaged |
| --- | --- |
| 1 | N2 - n1 |
| 2 | N1 - n1 |
| 3 | N2 - n2 |
| 4 | N1 - n2 |
| 5 | N2 - n3 |
| 6 | N1 - n3 |
| 7 | N2 - n4 |
| 8 | N1 - n4 |
| 9 | N2 - n5 |

-continued

| Gear Position | Gears Engaged |
| --- | --- |
| 10 | N1 - n5 |

The front gears have different numbers of teeth such that $N1 \neq N2$. Similarly, the rear gears have different numbers of teeth from each other and progressively decrease in number such that $n1$ $n2$ $n3$ $n4$ $n5$. The actual numbers of teeth for each of the gears are such that the per cent change in gear ratio is substantially the same for a majority of the successive shifts. In an acutal embodiment of the invention wherein $N1=52$, $N2=46$, $n1=34$, $n2=27$, $n3=21$, $n4=17$ and $n5=14$, this percentage change is about twelve per cent. As mentioned heretofore, in commonly used prior art ten-speed gear arrangements, the per cent change varies as much as from five to nineteen per cent.

Figures 5, 6:
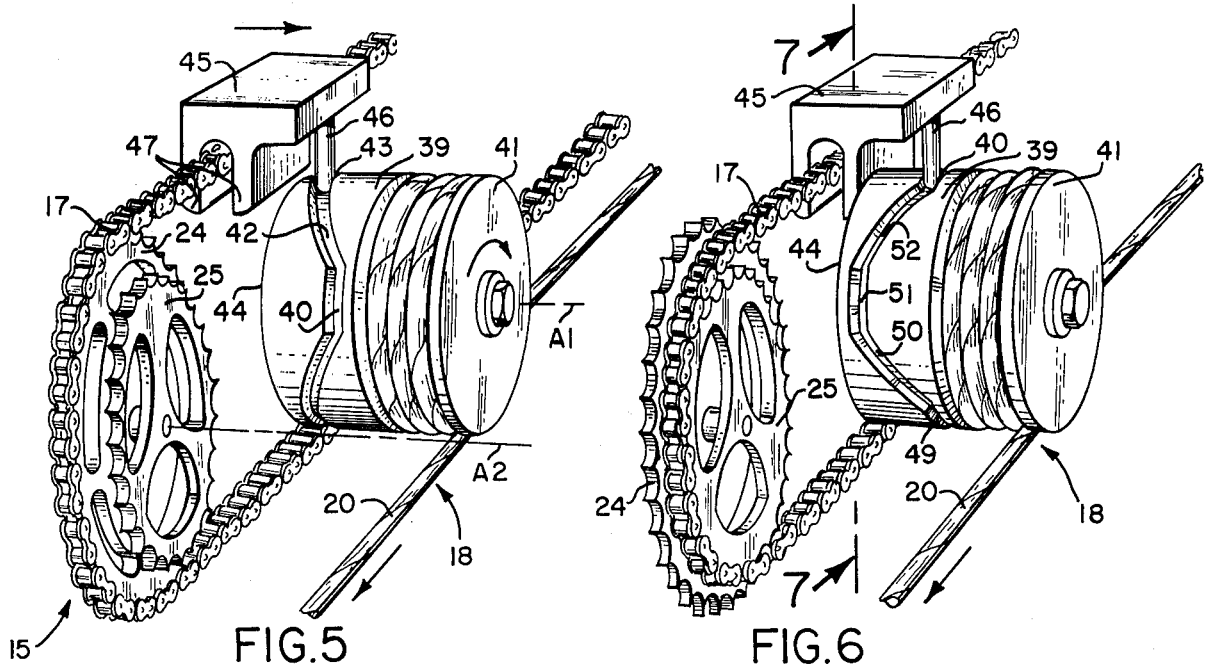
FIG. 5 is a perspective view, schematic in nature, of the front derailleur means looking in the direction of the arrow 5 of FIG. 1.
FIG. 6 is a view similar to FIG. 5 illustrating the relative positons of the components after a gear shift has been completed.

Referring now to the prespective view of FIG. 5, the manner in which shifting of the bicycle chain back and forth between the first and second gears 24 and 25 by the first derailleur means 18 as a consequence of movement of the cable through the given distances will be described. In FIG. 5, parts corresponding to those described heretofore are designated by the same numerals.

Essentially, the front derailleur means includes a cyclindrical front cam member 39 rotatably mounted to the frame for rotation about a transverse axis designated A1 parallel to the axis A2 of the front gear cluster 15 made up of the gears 24 and 25 as shown. This cam member includes a peripheral camming groove 40 over a first 180° of its surface, extending from adjacent to one side 41 of the cam member along a first helical path length 42 and thence along a first circumferential path length 43 adjacent to the other side 44 of the member. While not visible in FIG. 5, the path then extends around the peripheral surface back along a second helical path length, and thence along a second circumferential path lenth, this latter path length being adjacent to the said one side 41. The camming groove continues in like manner over the remaining 180° of the surface of the cylindrical front cam member 39 to connect to its starting point.

Referring to the upper portion of FIG. 5, there is shown a front carriage 45 having a cam follower pin 46 received in the groove on the cylindrical cam member 39. The arrangement is such that rotation of the cam member 39 will cam the cam follower pin 46 and thus the carriage 45 in a transverse direction as indicated by the arrow. As shown, the carriage 45 includes guide means 47 straddling the bicycle chain 17 and in alignment with the plane of one of the gears in the front cluster when the pin 46 is in a groove position adjacent to side wall 44 of the member and in alignment with the plane of the other of the gears in the front cluster when the pin is in a groove position adjacent the side wall 41 of the cam member 39.

It will be noted in both FIGS. 5 and 6 that the cable 20 wraps around the one side 41 of the cam member a given number of turns. As will become clearer as the description proceeds, an intermediate one of these turns is secured at its central portion to the cam member to prevent slippage of the cable relative to the cam member. The diameter of the one side of the cam member 41 is such that as the cable 20 is moved through the heretofore referred to given distance, the cam member is rotated 90°, the cam functioning in response to each movement of the cable through the referred to given distance to shift the chain from one of the two gears in the front gear cluster to the other.

FIG. 6 shows the relative positions of the components after such a shift.

Figure 7:
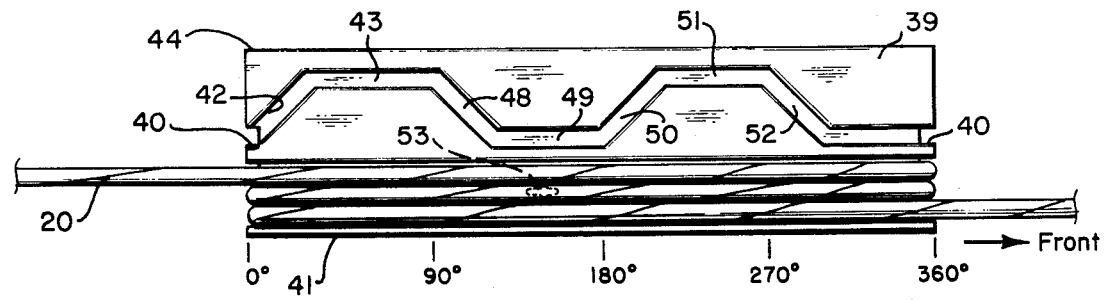
FIG. 7 is a layout of the cylindrical front cam member of FIG. 6 looking in the direction of the arrows 7—7.

FIG. 7 shows in laid out form the front cam member 39 described in FIGS. 5 and 6 wherein the remaining circumferential and helical path portions of the groove are shown at 48, 49, 50, 51 and 52. The repetition of the pattern every 180° is evident from FIG. 7. Each 90° portion includes a helical path and a circumferential path.

Shown in the center turn of FIG. 7 by the phantom lines 53 is the referred to securement point of the cable 20 to the cam member preventing slippage as described.

Figure 8:
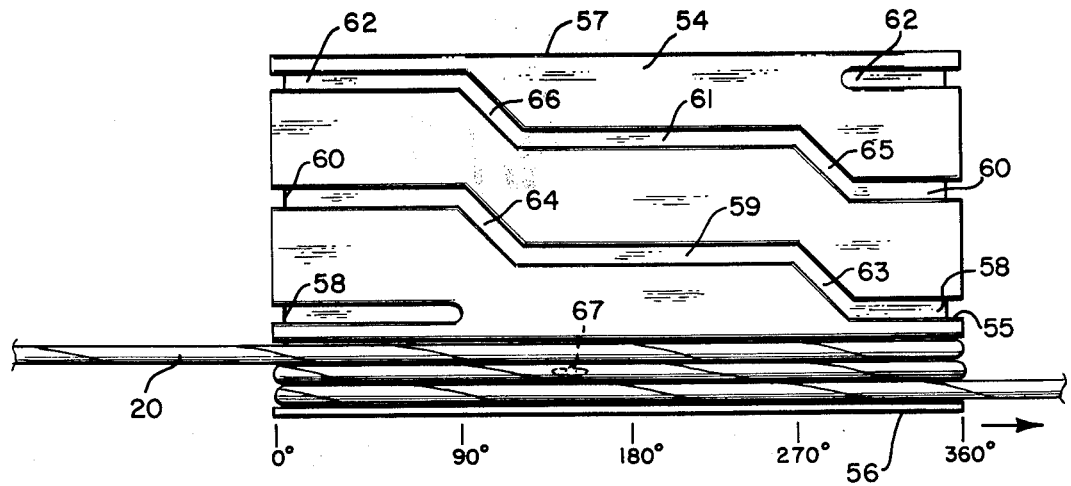
FIG. 8 is a layout of the cylindrical rear cam member for operating the rear derailleur means.
Figure 9:
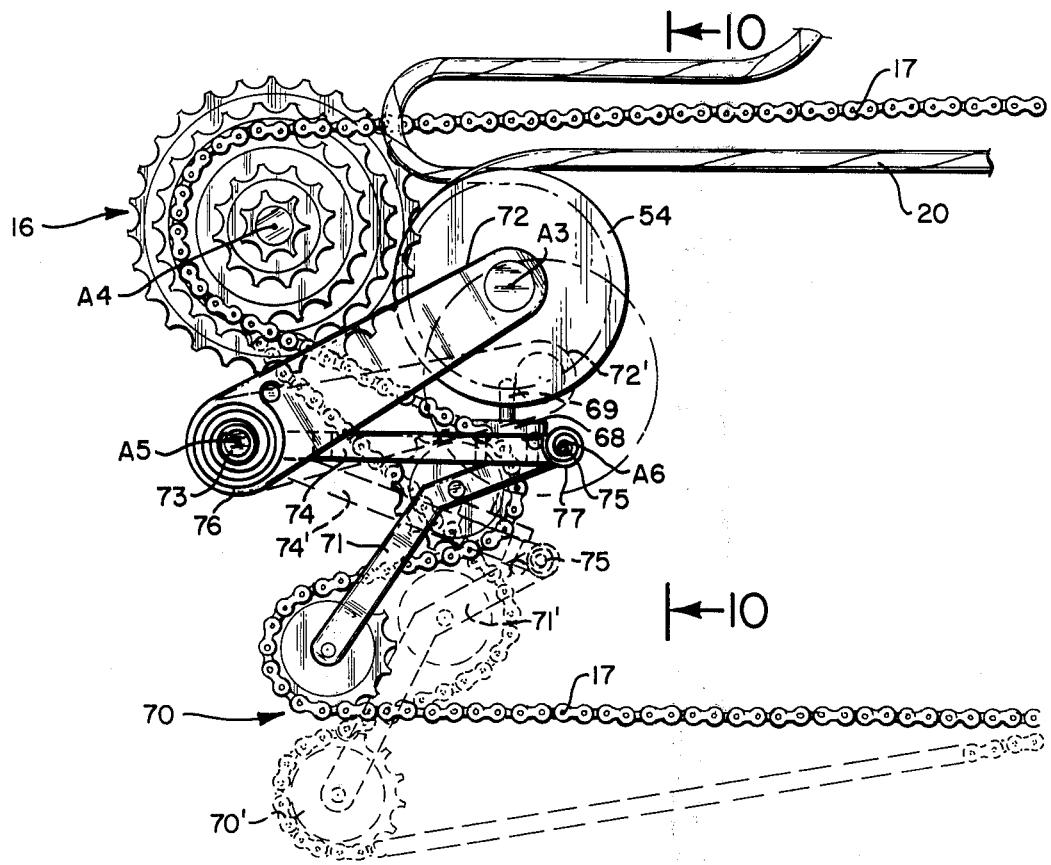
FIG. 9 is a side view, schematic in nature, of the rear derailleur means looking in the direction of the arrow 9 of FIG. 1; and, FIG. 10 is a front view taken in the direction of the arrows 10—10 of FIG. 9.
Figure 10:
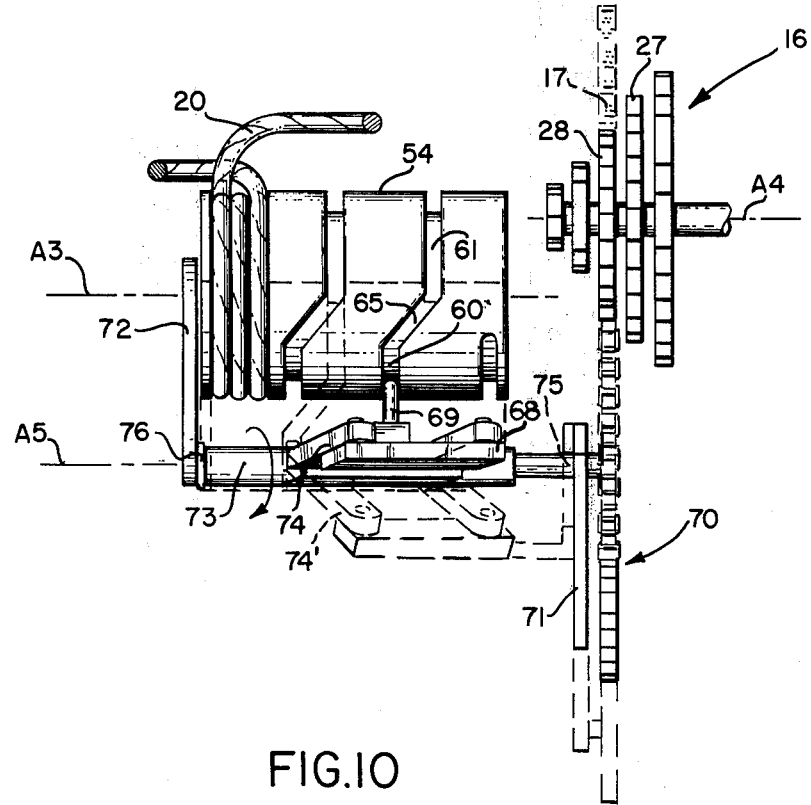

Referring now to FIGS. 8, 9, and 10 details of the rear derailleur means associated with the rear gear cluster will be described.

Referring first to FIG. 8, the rear derailleur includes a cylindrical rear cam member 54 shown laid out in the drawing and as will be clearer from FIGS. 9 and 10, mounted for rotation about a transverse axis parallel to the axis of the rear gear cluster. This cam member has a peripheral camming groove 55 over its surface extending from adjacent to one side 56 along alternate circumferential and helical path portions to a point adjacent to the other side 57 of the member. The circumferential path portions are indicated at 58, 59, 60, 61 and 62 while the intermediate alternate helical path portions are shown at 63, 64, 65 and 66.

The diameter of the one side 56 of the cylindrical rear cam member 54 is such that as the cable 20 is moved through twice the referred to given distance, the cam member is rotated 180°. As in the case of the cam member 39 of FIG. 7, the cable is wound around the one side 56 several turns an intermediate turn having a central portion secured to the cam member as at 67 to avoid any possibility of slippage.

As will be described with respect to FIGS. 9 and 10, there is associated with the rear cam member 57 a carriage and pin arrangement for shifting the bicycle chain when the carriage is moved in a transverse direction as a consequence of the pin following the grooves illustrated in FIG. 8.

With respect to the foregoing, it will be noted that the circumferential extent of the circumferential path of the camming groove in FIG. 8 is 90° greater than the distance of a circumferential path length on the front cam member of FIG. 7. Thus, while both cam members are simultaneously rotated when the cable is moved through a given distance, a shifting of the assocaited carriage and pin as a consequence of a helical portion of the cam groove will take place for every 90° rotation of the front derailleur cam member 39 while such a shift will only take place for a rotation of 180° for the rear cam member 54. In other words, the pin and carriage associated with the rear cam 54 of FIG. 8 will shift over a first 90° portion and remain in a circumferential groove over the second 90° portion making up the 180°, and thus not move transversly when a shift is being effected by the cam member 39 of FIG. 7. To facilitate the comparison of the cams, FIGS. 7 and 8 are in vertical alignment and the various degrees of rotation noted respectively thereon. The relationship of the camming grooves will thus be evident and it will be immediately understood why the rear gears are shifted only after the cable 20 has been moved twice through the given distance to rotate the rear cam 54 through 180° while gear shifting of the front gear cluster takes place for every 90° rotation of the front cam member 39.

Referring now to FIG. 9, the cylindrical rear cam member 54 described in FIG. 8 is shown mounted for rotation about an axis A3 parallel to the axis A4 of the rear gear cluster 16. Positioned beneath the cam member 54 is the associated carriage 68 and cam follower pin 69 projecting upwardly into a peripheral groove of the cylindrical member.

Referring to both FIGS. 9 and 10, an idler gear means designated generally by the numeral 70 is mounted to the carriage by means of a link 71. A main pivot arm means 72 supports the cam member 54 at its far end for rotation about the axis A3 as described and is secured at its near end to a journal shaft 73 mounted to the frame of the bicycle for swinging movement about an axis A5 parallel to the axis A4 of the rear gear cluster. The carriage 68, in turn, is coupled to the shaft 73 for transverse movement as by a parallelogram means 74. The link 71 carrying the idler gear means is pivoted to the carriage by auxiliary pivot means 75. It will be understood that since the main pivot arm 72 and coupling means 74 for the carriage 68 are both secured to the shaft 73, they will swing together about the axis A5 so that the carriage pin will stay in the cam groove.

The relative positions of the idler gear means 70, link 71, main pivot arm 72 and coupling means 74 supporting the carriage, when rotated about the axis A5 on the shaft 73 are shown in phantom lines in both FIGS. 9 and 10 at 70', 71', 72' and 74'.

In FIG. 10, the coupling means 74 in the form of a parallelogram mounting the carriage to the shaft 73 can best be seen in the phantom line position at 74'. It will be noted that the carriage 68 is positioned with its cam follower pin 69 received in the circumferential groove 60 of the rear cam member 54. It will be understood that the parallelogram means permits transverse movement of the carriage along with the idler gear means 70, this movement being from left to right or from right to left as viewed in FIG. 10.

The swinging of the cam member 54 and carriage 68 together with the idler gear means on shaft 73 about the axis A5 permits positioning of the chain 17 to accommodate larger diameter gears. The auxiliary pivoting at 75 of the link 71 carrying the idler gear means provides sufficient slack in the bicycle chain to permit its engagement with a next adjacent gear should the next adjacent gear be of larger diameter. Essentially, transverse movement of the carriage moves the idler gear means transversely to align the chain with the next adjacent gear in the rear gear cluster. Biasing springs shown at 76 and 77 in FIG. 9, in turn, act on pivot arm 72 and link 71 to maintain a tension in the chain.

OPERATION

The operation of the gear shift mechanism will be evident from the foregoing description.

Referring back to FIGS. 2 and 3, assume that the gear ratio is in an intermediate position such as position no 5 as indicated by the numeral 5 in the window of the cover 23. In this event, the chain 17 will pass over the gear 25 in the front gear cluster and the gear 28 in the rear gear cluster as shown.

As a person is riding his bicycle along in this particular gear position, should he wish to decrease the gear ratio in order to facilitate riding the bicycle along an upgrade he need only engage one of the radially extending knobs from the dial drum with his left thumb and urge it upwardly to thereby rotate the drum beneath the cover through a partial circumferential distance until the number 4 appears in the window, all this without having to remove his hand from the bicycle handlebars.

Referring specifically to FIG. 6, the resulting movement of the cable 20 through the given distance will rotate the front cam member 39 to cause the camming pin 46 to move from the one side 41 to the other side 44 upon a 90° rotation. The chain 17 will thus be shifted from the gear 25 to the gear 24. Looking at FIG. 7, the cam pin for the carriage 45 of FIG. 6 thus moves from the circumferential path 40 along the helical path 62 to the circumferential path 51.

In the particular shift described, the rear derailleur cam member 54 as viewed in FIG. 8 will be rotated through 90° as a consequence of the movement of the cable thereby moving the associated camming pin in the rear member 54 from the circumferential portion 60 along the helical path 65 to the circumferential portion 61. Referring to FIG. 10, it will be evident that this motion of the cam follower pin 69 will shift the carriage 68 to the right as viewed to thereby move the chain 17 from the gear 28 to the next larger gear 27.

It will be noted from the foregoing that both the derailleurs have been actuated by a single partial circumferential movement of the dial drum through the given circumferential distance all in an automatic manner.

In the event the bicycle rider wishes to increase the gear ratio from the initial position No. 5 described in FIGS. 2 and 3, he would simply engage one of the knobs on the drum with his right hand thumb and effect a counterclockwise rotation of the drum as viewed in FIG. 3 to position the number 6 in the window 31. This action would move the cable 20 through the given distance but in an opposite direction from that described with respect to FIGS. 5 and 6. Thus, the front cam member 39 would be rotated to move the cam pin 46 from the circumferential path 40 along the helical path 42 to the circumferential path 43 as viewed in FIG. 7. In other words, the final position would be as illustrated in FIG. 5 so that the chain 17 is moved from the smaller gear 25 to the larger gear 24.

This same given movement of the cable 20 will not shift the carriage associated with the rear cam 54 since, as viewed in FIG. 8, the pin in the circumferential groove 60 will simply remain in that groove through the 90° rotation in the opposite direction. It will be evident by comparing FIGS. 7 and 8 that when the cam pin is in the circumferential groove 43 of FIG. 7, the cam pin associated with the rear cam member 54 will still be in the groove 60.

Accordingly, with respect to the rear gear cluster, the chain will remain on the gear 28 when the shift is made to the next higher gear position 6 from the gear position 5.

The rear derailleur is thus actuated only on every other partial circumferential movement of the dial in a direction to increase the gear ratio continuously through the ten positions or to decrease the gear ratio continuously through the 10 positions. This alternate operation will be evident from the table given heretofore in the specification associating the gear position with the particular gears engaged.

From all of the foregoing, it will be immediately evident that the shifting of the bicycle gears is not only greatly facilitated but is positively carried out, the partial circumferential rotations of the drum being positively indexed as described with respect to FIGS. 3 and 4. Moreover, the cam means in the form of the cylindrical cam members assures a positive positioning of the derailleur portions which positioning is consistent for each gear position throughout the range. Reliance on feel and the like is thus avoided.

While the particular preferred embodiment has been described in conjunction with a ten-speed bicycle with front and rear derailleurs, it should be understood that the basic principles of this invention are applicable to other gear combinations and other speed bicycles. The invention accordingly is not to be thought of as limited to the specific embodiment set forth for illustrative purposes.

What is claimed is:

1. In combination with a bicycle having a frame structure mounting handlebars, pedals, and front and rear wheels, an improved gear shift including:
    a. a front gear cluster including two gears having N1 and N2 teeth respectively, different in number from each other, coaxially mounted in side-by-side relationship and coupled for rotation by the bicycle pedals;
    b. a rear gear cluster including at least two gears having n1 and n2 teeth respectively, different in number from each other, coaxially mounted together in side-by-side relationship and coupled to rotate said rear wheel;
    c. a bicycle chain passing over one of the gears in the front gear cluster and one of the gears in the rear gear cluster;
    d. a front derailleur means coupled to the bicycle frame structure and to said bicycle chain associated with said front gear cluster;
    e. a rear derailleur means coupled to the bicycle frame structure and to said bicycle chain associated with said rear gear cluster;
    f. a dial means including a drum mounted on the bicycle for manual rotation by a bicycle rider; and
    g. a single continuous actuating cable passing from said drum through the front and rear derailleur means in series and back to said drum such that partial rotation of said drum through a given circumferential distance moves said cable a given distance, said front derailleur means functioning in response to each movement of said cable through said given distance to shift said chain from one of the two gears in said front gear cluster to the other, and said rear derailleur means functioning in response to movement of said cable through twice said given distance to shift said chain from one of the gears in said rear gear cluster to the next adjacent gear, said rear derailleur means thus only effecting a shift once for every two partial rotations of said drum in the same direction through said given circumferential distance.

2. The subject matter of claim 1, in which said drum has radially extending knobs for facilitating manual rotation thereof and includes a stationary cover plate having a window, the side of said drum over which said cover lies having circumferentially spaced numerals successively visible through said window when said drum is partially rotated through said given circumferential distances; and, indexing detent means for indexing said drum at each number location in said window whereby the various gear combinations established by the various successive positions of said drum can be discerned by observing the number appearing in said window.

3. The subject matter of claim 1, in which said front derailleur means includes a cylindrical front cam member rotatably mounted to said frame for rotation about a transverse axis parallel to the axis of said front gear cluster and having a peripheral camming groove over a first 180° of its surface extending from adjacent to one side of the member along a first helical path length to a point adjacent to the other side of the member and thence along a first circumferential path length adjacent to said other side, and thence back along a second a helical path to a point adjacent to said one side, and thence along a second circumferential path length adjacent to said one side, the camming groove continuing in like manner over the remaining 180° of said surface to connect to its starting point, each 90° portion of the cam including a helical path and a circumferential path, said one side of said front cam member having said cable wrapped thereabout a given number of turns and secured at the central portion of an intermediate turn to said front cam member, the diameter of said one side being such that as said cable is moved through said given distance, said front cam member is rotated 90°; a first carriage having a cam follower pin received in said groove such that said carriage is shifted laterally in the axial direction of said cylindrical front cam member in response to rotation of said member through 90°, said carriage including guide means straddling said chain and in alignment with the plane of one of said gears in the front gear cluster when the pin is in a groove position adjacent said one side of said member and in alignment with the plane of the other of said gears in the front cluster when the pin is in a groove position adjacent said other side of said member.

4. The subject matter of claim 3, in which said rear derailleur means a cylindrical rear cam member mounted for rotation about a transverse axis parallel to the axis of said rear gear cluster and having a peripheral camming groove over its surface extending from adjacent to one side of the member along alternate circumferential and helical path portions to a point adjacent the other side of the member, the number of circumferential path portions corresponding to the number of gears making up said rear gear cluster, the circumferential distance of each circumferential path portion being 90° greater than the distance of a circumferential path length on said front cam member, said one side of said rear cam member having said cable wrapped thereabout a given number of turns and secured at the central portion of an intermediate turn to said rear cam member, the diameter of said one side being such that as said cable is moved through twice said given distance, said rear cam member is rotated 180°; a rear carriage having a cam follower pin received in said groove such that said carriage is shifted laterally in the axial direction of said cylindrical rear cam member from one circumferential path portion to a next successive circumferential path portion in response to rotation of said rear cylindrical member through 180°, such shifting taking place over a first 90° portion and said pin remaining laterally in place over the second 90° portion making up each 180° rotation, said carriage carrying idler gear means over which said chain passes; main pivot arm means mounting said cylindrical rear cam member and carriage to said frame for swinging movement about a transverse axis parallel to the axis of the rear gear cluster; coupling means mounting said rear carriage to said main pivot means to permit transverse movement of said carriage; and, auxiliary pivot means mounting said idler gear means to said carriage for swinging movement about an axis parallel to the axis of said rear gear cluster relative to the carriage, whereby transverse movement of the carriage moves the idler gear means transversely to align said chain with the next adjacent gear in the rear gear cluster, said main pivot arm means and said auxiliary pivot means being biased to swing in a manner to maintain a tension in the chain.

5. The subject matter of claim 1, in which said rear gear cluster includes a total of five gears, the three gears in addition to said first mentioned two gears having $n3$, $n4$ and $n5$ teeth respectively, different from each other, the chain engaging front and rear gears in the following sequence for each successive partial rotation of drum through said given circumferential distance starting at the lowest gear ratio to the highest, wherein there are ten gear positions and wherein $N1 > N2$ and $n1 > n2 > n3 > n4 > n5$:

| Gear Position | Gears Engaged |
| --- | --- |
| 1 | N2 - n1 |
| 2 | N1 - n1 |
| 3 | N2 - n2 |
| 4 | N1 - n2 |
| 5 | N2 - n3 |
| 6 | N1 - n3 |
| 7 | N2 - n4 |
| 8 | N1 - n4 |
| 9 | N2 - n5 |
| 10 | N1 - n5 | the percent change in gear ratio being substantially the same for a major number of successive shifts.

* * * * *